INVENTOR.
Homer E. Benson

United States Patent Office 3,823,222
Patented July 9, 1974

3,823,222
SEPARATION OF CO₂ AND H₂S FROM
GAS MIXTURES
Homer E. Benson, Pittsburgh, Pa., assignor to The
Benfield Corporation, Berwyn, Pa.
Continuation of abandoned application Ser. No. 856,393,
Sept. 9, 1969. This application Jan. 10, 1972, Ser. No.
216,844
Int. Cl. B01d 53/34
U.S. Cl. 423—223                                    9 Claims

ABSTRACT OF THE DISCLOSURE

Process for removing $CO_2$ and $H_2S$ from hot steam-containing gas mixtures using aqueous alkaline scrubbing solutions circulated between a high-pressure absorption stage and a low-pressure regeneration stage where the solution is steam-stripped. More efficient production of stripping steam from the hot feed gas is accomplished by generating a first supply of moderate-pressure steam (e.g. 50 p.s.i.g.) in a water boiler, preferably supplied by aqueous condensate generated in the scrubbing system. The first steam supply is utilized as motive steam in a steam ejector which creates a reduced pressure in a flashing zone supplied with hot, regenerated solution, thereby producing flash steam which is compressed by the motive steam and fed into the regenerator as stripping steam. The hot feed gas leaving the first boiler generates a second supply of lower-pressure steam by indirect heat exchange with regenerated scrubbing solution which second source of steam is fed directly to the regenerator as stripping steam. This system provides increased overall recovery of stripping steam from the hot, steam-containing feed gas, thereby reducing outside steam requirements.

This is a continuation of Application Ser. No. 856,393, filed Sept. 9, 1969, now abandoned.

This invention relates to the removal of $CO_2$ and $H_2S$ from hot, steam-containing gas mixtures.

The removal of acid gases, principally $CO_2$ from raw synthesis gases, as produced, for example, by the steam-reforming (followed often by water-gas shift) of natural gas or naphtha, or by the partial oxidation of natural gas, hydrocarbon liquids, or solid fuels such as coal, is of considerable industrial importance.

The raw synthesis gases produced by such processes may consist, for example, of $CO_2$ and hydrogen; mixtures of $CO_2$, hydrogen and nitrogen; or mixtures of $CO_2$, CO, and hydrogen, which, after removal of the $CO_2$ content, may be used e.g. for hydrogenation, ammonia synthesis, Oxo-Synthesis, methanol synthesis, Fischer-Tropsch synthesis, or like processes. Such raw gases are generally produced at elevated pressures of e.g. 100 to 1500 pounds per square inch at temperatures of e.g. 800° C. to 1600° C. and containing substantial amounts of steam. Typically, the $CO_2$ content of such mixtures will range from 5% to 35%, and depending upon the sulfur content of the starting material, may contain small amounts of $H_2S$. Efficient recovery of the considerable heat content of these gas mixtures has an important bearing on the overall economics of synthesis gas production. In accordance with current practice, the hot gases, from the reforming furnace, partial oxidation unit, or water-gas shift reactor are passed through one or more heat recovery stages where the heat content of the gas mixtures is employed to generate steam at moderate pressures in waste heat boilers, or to preheat air or boiler feed water. After thus cooling the gas mixture to fairly low temperatures of e.g. 150° C. to 200° C., it is generally delivered to the $CO_2$ scrubbing unit where the bulk of the $CO_2$ is to be removed.

The most widely used method for the bulk removal of the $CO_2$ content of such gas mixtures involves the use of regenerable alkaline scrubbing solutions which are circulated in a cyclic process between an absorption stage where the acid gases are absorbed and a regeneration stage where the absorbed acid gases are desorbed by steam-stripping. In the more efficient of such methods, the absorption and regeneration stages are operated, at least for the most part, at the same temperatures, namely at temperatures in the vicinity of the atmospheric boiling temperature of the scrubbing solution, thus eliminating the otherwise high heat losses that result when the solution is alternately heated and cooled between the absorption and regeneration stages.

In such scrubbing processes, the major operating expense is the steam required for steam-stripping the solution in the regeneration stage. In order to minimize the use of externally generated stripping steam and to further cool the $CO_2$-containing gas mixture before introducing it into the absorber, the hot, steam-containing gas mixture (typically delivered to the scrubbing unit at temperatures of from 150° C. to 200° C. and saturated, or nearly saturated, with steam) is used to furnish a major portion, or in some cases, all of the heat required to generate such stripping steam. This is usually accomplished by passing the hot, steam-containing gas mixture in indirect heat exchange with the aqueous scrubbing solution in a so-called solution reboiler, the steam thereby generated being employed as stripping steam in the regenerator.

In accordance with the present invention, a method has been found for markedly increasing the amount of stripping steam that can be effectively recovered from such hot, steam-containing gas mixtures, thereby in some cases eliminating the need for auxiliary sources of stripping steam and/or permitting additional heat recovery from the gas mixture upstream from the scrubbing unit. Other advantages of the new method, such as economies in the use of treated feed water, reduction of corrosion, and reduction of capital costs through the use of a simpler scrubbing system will be apparent from the description which follows.

According to the invention, a method is provided in which a regenerable aqueous alkaline scrubbing solution is circulated in a cyclic process between an absorption stage maintained at substantially superatmospheric pressure and, at least in part, at temperatures in the vicinity of the atmospheric boiling temperature of the scrubbing solution, and a regeneration stage wherein the solution is steam-stripped at substantially reduced pressures to desorb acid gas contained in the solution. The hot, steam-containing gas mixture to be treated for the removal of its acid gas content, and capable of furnishing at least the major portion of the heat required for steam-stripping the scrubbing solution, is first passed in indirect heat exchange with boiling water (the boiler feed water source is preferably aqueous condensate produced by the condensation of water vapor evolved from the scrubbing solution), thereby generating a first supply of steam under superatmospheric pressure and partially cooling the gas mixture. The partially cooled gas mixture is then passed in indirect heat exchange with regenerated scrubbing solution from the regeneration stage, thereby generating a second supply of steam at a lower level of pressure and further cooling the gas mixture. Hot, regenerated solution from the regeneration stage is fed to a flashing zone maintained under reduced pressure by means of a steam ejector having its suction side connected to the flashing zone. The first supply of superatmospheric-pressure steam generated by the hot gas mixture is fed to the steam ejector as motive steam to reduce the pressure in the flashing zone and to compress the flash steam which evolves, and the mixture of motive steam and flash steam is fed to the regeneration stage as stripping steam.

The second supply of lower-pressure steam generated by the hot gas mixture is fed to the regeneration stage as additional stripping steam, while the cooled gas mixture, with or without passing through further heat recovery operations, is fed to the absorber for the removal of its acid gas content.

As will be shown in the examples which follow, the use of the hot, steam-containing raw gas for generating two separate steam supplies, one at superatmospheric pressure and used as motive steam for operation of the steam ejector, and the other a lower-pressure supply used as stripping steam, produces a markedly higher net efficiency in the utilization of the heat content of the process gas than the use of the hot feed gas for the generation of a single source of steam, or the use of extraneously supplied steam for the operation of the steam ejector.

Reference is now made to the accompanying drawings wherein FIG. 1 is a diagrammatic flow sheet illustrating a preferred embodiment of the invention.

Figure 1:
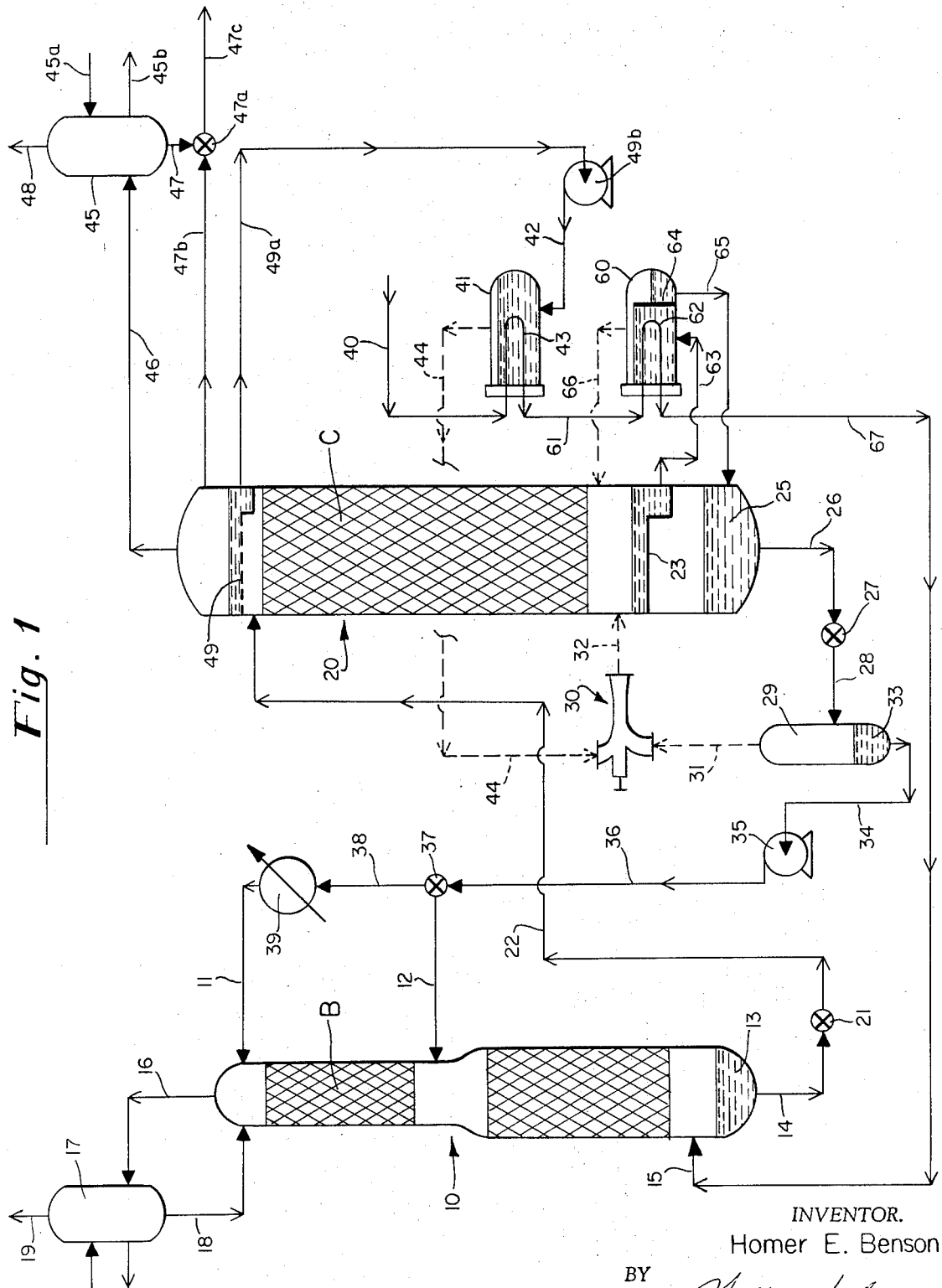

Referring now to FIG. 1, the reference numeral 10 refers generally to an absorber column adapted to operate at superatmospheric pressures. The absorption stage should be maintained at substantial superatmospheric pressures of at least 100 pounds per square inch gage, and preferably 200 pounds per square inch gage. Absorber pressures in typical applications of the invention will generally range from 250 to 1500 pounds per square inch gage. The cross-hatched sections A and B of the absorber represent suitable packing material for producing intimate gas-liquid contact such as Raschig rings, Berl saddles, Intalox saddles or other types of packing bodies exposing a large surface of liquid to the gas flowing through the packing. Means other than packing materials, such as plates equipped with bubble caps or sieve trays or other means for insuring intimate contact between gas and liquid, may be employed to achieve the desired intimate gas-liquid contact in the absorber.

The absorber column 10 is supplied with regenerated scrubbing solution, such as an aqueous potassium carbonate solution, by lines 11 and 12. Line 11 delivers a stream of scrubbing solution to the top of the absorber column and this stream flows down over the packing in section B. Line 12 delivers a second stream of scrubbing solution above packed section A. The solution introduced by line 11 mixes with that introduced by line 12 and the mixed solution then flows down over section A and collects at the bottom of the tower in sump 13, and is removed from the absorber tower by line 14.

In general, any regenerable aqueous alkaline scrubbing solution may be employed in the system of the invention. Particularly preferred are aqueous solutions of potassium carbonate, particularly relatively concentrated potassium carbonate solutions having potassium carbonate concentrations by weight of 15% to 45%, and preferably from about 22% to 35% (these concentrations by weight being calculated on the assumption that all the potassium present is present as potassium carbonate). Such potassium carbonate solutions are preferably activated by the addition of additives such as ethanolamines, alkali metal borates such as potassium or sodium borate, $As_2O_3$, amino acids such as glycine, or other additives which tend to increase the rates of absorption and desorption of acid gas in the potassium carbonate solution.

Particularly preferred among these activators for potassium carbonate solutions are the alkanolamines which are preferably added to the potassium carbonate solutions in amounts ranging from about 1% to 10% by weight, and preferably from about 2% to 6% by weight. Diethanolamine, $NH(CH_2CH_2OH)_2$, is preferred from the standpoints of cost, relatively low volatility, and effectiveness. However, monoethanolamine, $H_2NCH_2CH_2OH$, or triethanolamine, $N(CH_2CH_2OH)_3$, may also be employed in place of diethanolamine, or mixtures of any two or three of these ethanolamines may be employed as additives to potassium carbonate solutions.

In addition to the potassium carbonate solutions, with or without activators, other regenerable aqueous alkaline scrubbing solutions may be employed such as aqueous solutions of the ethanolamines or aqueous solutions of the alkali metal phosphates such as potassium phosphate.

As is well known, the reactions occurring during absorption and regeneration differ depending upon the particular scrubbing solution employed. In the case of potassium carbonate, the absorption of $CO_2$ produces potassium bicarbonate while regeneration or desorption releases $CO_2$, producing potassium carbonate. As is also well known, the reversible absorption and desorption reactions do not go to completion in either the absorption or regeneration stages, and consequently the scrubbing solution, as circulated, is actually a mixture. In the case of potassium carbonate solutions, for example, the regenerated scrubbing solution fed to the absorber in the case of $CO_2$ absorption is a carbonate-bicarbonate mixture rich in carbonate while the solution leaving the absorber is a mixture rich in bicarbonate. References herein to scrubbing solutions of potassium carbonate, ethanolamines, potassium phosphate are, of course, intended to include mixtures of these compounds with the reaction products formed during the absorption process.

The gas stream to be purified of its acid gas content enters the bottom of the absorber tower 10 by line 15 and flows upwardly countercurrently to the liquid descending through sections A and B, and leaves the top of the absorber in a purified condition through line 16. If desired or necessary, the gas stream leaving the absorber by line 16 is passed through a cooler-condenser 17 where the gas is cooled and water vapor condensed. The aqueous condensate from condenser 17 may be returned to the top of the absorber by line 18. The purified gas passes out of the cooler-condenser by line 19 for any desired use.

Regeneration of the solution occurs in the regeneration column generally designated by the reference numeral 20. In the embodiment shown, the regeneration column is supplied with a cross-hatched section C which is provided with suitable packing materials, plates, or other suitable means for insuring intimate contact between the descending solution and stripping steam introduced at the bottom of the column.

Spent scrubbing solution, containing absorbed acid gas, is withdrawn from sump 13 at the bottom of absorber tower 10 by line 14 and conducted to a pressure letdown valve 21 where the pressure on the solution is reduced to that prevailing at the top of the regeneration tower 20, and then the depressurized solution is conducted by line 22 to the top of the regeneration tower whence the solution flows downwardly over packing or trays or the like in section C countercurrently to upwardly flowing stripping steam. The regenerated solution is collected on a collecting tray 23 at the bottom of the regeneration tower 20. From collecting tray 23, the solution flows into reboiler 60 by line 63 and then flows into sump 25 at the bottom of the tower as will be described more in detail hereinafter.

Hot, regenerated scrubbing solution collecting in sump 25 is conducted by line 26 to a pressure letdown valve 27 and then by line 28 to flashing tank 29 wherein the pressure over the solution is reduced by means of a steam ejector designated generally by the reference numeral 30. As a result of the reduction in pressure, steam is evolved from the solution and the evolved steam is conducted by line 31 to the steam ejector 30 where it is mixed with motive steam and thereby compressed and fed into the regenerator as stripping steam by line 32, and will be described in more detail hereafter.

The evolution of steam in flash vessel 29 is endothermic and results in cooling of the solution. The cooled solution collecting at the bottom of flash vessel 29 in sump 33 is conducted by line 34, recycle pump 35, and line 36 to flow control valve 37 where the stream of regenerated scrubbing solution is split into two portions, one portion flowing by line 12 into the absorber tower above section A and the other portion flowing by line 38 to cooler 39 where the solution is cooled by indirect heat exchange, e.g. with air or cooling water, and thence by line 11 to the top of the absorber tower.

In the operation of the system of FIG. 1, the cooled, regenerated solution entering the top of the absorber by line 11 will generally be a minor proportion (e.g. of the order of 10% to 40%) of the total solution circulating in the absorber tower. When using potassium carbonate scrubbing solutions, particularly those containing activators, the stream entering the top of the absorber will often be cooled to temperatures of the order of 50° C. to 90° C. and often preferably to temperatures of 60° to 80° C.

The major stream of solution entering the absorber by line 12 is not subjected to cooling (other than the moderate cooling that occurs in flash tank 29) and enters the absorber at a temperature in the vicinity of the atmospheric boiling temperature of the solution, and thus the bulk of the absorption occurring in the absorber takes place at such elevated temperature.

In the embodiment of FIG. 1, stripping steam for regeneration of the solution is supplied entirely by hot, steam-containing gas which is to be purified by removal of its acid gas content. Thus, in FIG. 1, the hot, steam-containing gas mixture (typically at 175° C. and saturated with steam and containing e.g. 20% $CO_2$) is introduced into the system by line 40. This hot, steam-containing gas mixture is used to raise two separate sources of steam, as will now be described. A first source of steam at a moderate, superatmospheric pressure of e.g. from 35 to 60 p.s.i.g. (pounds per square inch gage) is raised in boiler 41 supplied with feed water by line 42 which is heated and boiled by the hot, steam-containing gas mixture which flows through a closed coil 43 immersed in the water supplied by line 42. Steam raised in reboiler 41 flows by line 44 to steam ejector 30.

In the preferred embodiment shown in FIG. 1, feed water for boiler 41 is supplied by aqueous condensate produced by the condensation of water vapor evolved from the scrubbing solution. In the embodiment shown, such aqueous condensate is derived from overhead condenser 45. The mixture of steam and desorbed acid gas collecting at the top of regenerator tower 20 is removed by line 46 and passed through condenser 45 (supplied e.g. with cooling water through lines 45a and 45b) where steam is condensed to produce aqueous condensate which is refluxed back into the system through line 47. The gaseous effluent from the condenser, consisting largely of acid gas, is removed by line 48.

The equeous condensate flowing from line 47 is conducted to a flow control valve 47a where it may be divided into two portions. One portion is returned by line 47b to the top of the regenerator tower. A second portion, depending on the water balance in the system, may be conducted by line 47c to waste or for any desired use outside the scrubbing system.

The condensate refluxed by line 47b to the top of the regeneration tower is, in the embodiment shown in FIG. 1, fed to and collected on perforated tray 49. In this way, spent stripping steam passing upwardly from section C is caused to bubble upwardly through the perforations in tray 49, heating the condensate on tray 49 to a temperature of e.g. 80° C. to 100° C. The condensate, thus preheated, is drawn off tray 49 by line 49a and then fed, with the aid of booster pump 49b if necessary, and line 42 to boiler 41.

The first supply of steam generated in boiler 41, at a moderate, superatmospheric pressure of typically of the order of 35 to 60 p.s.i.g. is, as previously mentioned, conducted by line 44 to steam ejector 30 where it is employed as motive steam to provide a reduced pressure in flashing vessel 29 and, at the same time, to compress steam evolved in the flashing operation occurring in vessel 29 so that the mixture of flash and motive steam may be injected into regeneration tower 20 by line 32 as stripping steam.

Figure 2:
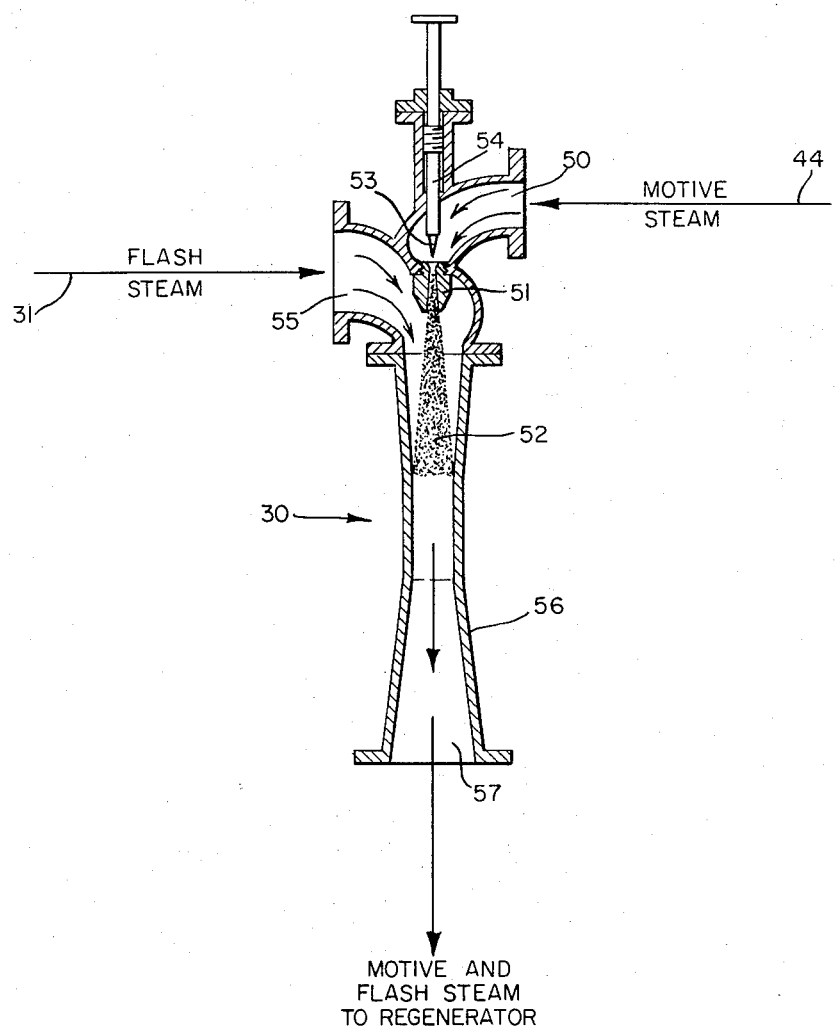
FIG. 2 is a semi-diagrammatic illustration of one form of steam ejector usable in the process of the invention.

Reference is now made to FIG. 2 which semi-diagrammatically illustrates one form of suitable steam ejector 30. Motive steam from line 44 at a moderate pressure of e.g. 50 p.s.i.g. enters the ejector at inlet 50, and then flows through nozzle 51 which creates a high-velocity jet of steam indicated by the stippled area 52.

The flow through the nozzle may be controlled by spindle valve 53 actuated by shaft 54.

The high-velocity jet of steam issuing from the nozzle creates a suction at suction inlet 55 which connects with flashing vessel 29 by line 31. The motive steam and flash steam mix and pass into the forward, flaring section 56 of the ejector where the mixture of motive steam and flash steam come to a pressure intermediate between that of the motive steam entering at inlet 50 and the flash steam entering at suction inlet 55. For example, with motive steam at 50 p.s.i.g. creating suction on flash tank 29 and producing flash steam at a pressure of 4 p.s.i.g., an intermediate discharge pressure at discharge end 57 of the ejector of e.g. 10 p.s.i.g. may be achieved by proper sizing and design of the nozzle and forward section of the ejector. The mixture of motive steam and flash steam at this intermediate pressure is injected into the bottom portion of the regenerator as stripping steam.

Returning to FIG. 1, a second source of steam at a lower pressure is generated in solution reboiler 60. The hot, steam-containing gas mixture, partially cooled by passage through coil 43 of boiler 41, leaves boiler 41 by line 61 and passes through closed coil 62 by means of which it is maintained in indirect heat-exchange contact with scrubbing solution introduced into reboiler 60 by line 63. Line 63 draws off regenerated scrubbing solution from collection tray 23, feeds it into reboiler 60 whence it circulates over coil 62, overflows baffle 64, and then is circulated to sump 25 of the regeneration column by line 65. Steam raised in reboiler 60 is fed into regeneration column 20 by line 66.

The hot gas mixture, further cooled after passing through coil 62, is then conducted by line 67 and line 15 to the base of absorber 10 for removal of its acid gas content.

EXAMPLE 1

The operation of the system of FIG. 1 will now be described for a typical application. The hot, steam-containing feed gas introduced into the system by line 40 is derived from the pressure reforming and water-gas shift of natural gas. It is delivered to the system by line 40 at a pressure of 383 p.s.i.g. at a temperature of 172° C. and saturated with water vapor at this temperature, and at a flow rate of 7,900,000 standard cubic feet per hour. The gas, intended for ammonia synthesis, contains 18.3% $CO_2$ (dry basis), the remainder being a mixture of hydrogen and nitrogen in a molar ratio of essentially 3:1. This hot process gas flows through coil 43 of boiler 41 in indirect heat-exchange contact with aqueous condensate from overhead condenser 45 which enters boiler 41 through line 42 at a temperature of approximately 95° C. Steam is generated in boiler 41 at the rate of 60,000 pounds per hour and at a pressure of 50 p.s.i.g., and flows through line 44 to steam ejector 30 as motive steam. The partially cooled process gas leaves coil 43 by line 61 at a temperature of 160° C. and then flows through coil 62 of reboiler 60 which is supplied with a regenerated solution of potassium carbonate (30% by weight of potassium carbonate containing 3% by weight of diethanolamine) by line 63.

Steam is generated in reboiler 60 at a rate of 94,800 pounds per hour at a pressure of 6 p.s.i.g., and this steam is introduced by line 66 into the regenerator as stripping steam. The hot process gas, now cooled to a temperature of 123° C. leaves reboiler 60 by line 67 and is introduced into absorber 10 operating at a pressure of 375 p.s.i.g. by line 15. Regenerated scrubbing solution at a circulation rate of 117,720 gallons per hour and at a temperature of 70° C. is introduced by line 11 to the top of the absorber while a second stream of scrubbing solution at a circulation rate of 239,000 gallons per hour and at a temperature of 104° C. is introduced by line 12 above section A. The scrubbing solution employed, as indicated previously, is a 30% by weight potassium carbonate solution containing 3% diethanolamine and both streams have a potassium bicarbonate fraction* of 30%. The gas, after passing countercurrently through section A and section B in countercurrent contact with descending scrubbing solution, leaves by line 16 at a temperature of approximately 70° C. and containing 0.1% $CO_2$.

The spent scrubbing solution collects in sump 13 at the bottom of the absorber at a temperature of 111.3° C. and with a potassium bicarbonate fraction of 78%. The stream of spent solution is withdrawn by line 14 and, after passing through pressure letdown valve 21, is introduced by line 22 into the top of regenerator column 20 operating at a pressure (at the top of the column) of 2 p.s.i.g. The pressure at the bottom of the column (i.e. below packed section C) is about 5 p.s.i.g. due to the pressure drop through the packing. On exposure to the reduced pressure in the regeneration column, the solution flashes off some steam and $CO_2$ and cools, after which it passes downwardly through packed section C countercurrently to stripping steam introduced at the bottom of the column and collects on collecting plate 23. After flowing through reboiler 60, the regenerated solution collects in sump 25 with a potassium carbonate fraction of 30% and at a temperature of 113° C. It is withdrawn from the bottom of the column by line 26 and, after passing through pressure letdown valve 27, enters flash tank 29 maintained at a pressure of 0 p.s.i.g. by means of steam ejector 30. Steam is generated in flash vessel 29 at the rate of 48,300 pounds per hour at 0 p.s.i.g., causing the solution to cool to a temperature of 104° C. in sump 33 of the flash tank. The cooled solution from sump 33 is recirculated by line 34, pump 35 and line 36 to flow control valve 37 where it is split into two portions, one flowing at the rate of 239,000 gallons per hour at a temperature of 104° C. into the absorber above section A. The other portion flows at the rate of 117,720 gallons per hour to cooler 39 where the solution is cooled to a temperature of 70° C. and then introduced by line 11 into the top of the absorber tower.

The flashed steam generated in flash vessel 29 is conducted by line 31 to the suction inlet of steam ejector 30 where it mixes with motive steam introduced by line 44 at a pressure of 50 p.s.i.g. and at the rate of 60,000 pounds per hour. The mixture of motive steam and flash steam compressed to an intermediate pressure of 6 p.s.i.g. flows at the rate of 108,300 pounds per hour to the bottom of regenerator tower 20 through line 32 to serve as stripping steam.

The overall stripping steam requirement of 203,100 pounds per hour is supplied, in accordance with the above

---

*The "potassium bicarbonate fraction," as used herein, means the proportion of original potassium carbonate ($K_2CO_3$) expressed in percent which has been converted to potassium bicarbonate by reaction with $CO_2$. For example, a solution having a potassium bicarbonate fraction of 25% is obtained by the conversion of 25 mol percent of the potassium carbonate content of the solution to potassium bicarbonate such that the ratio of potassium ions present as potassium carbonate to potassium ions present as potassium bicarbonate is 3:1. Since two mols of potassium bicarbonate are produced for each mol of potassium carbonate, the mol ratio of $K_2CO_3 : KHCO_3$ at a 25% bicarbonate fraction is 3:2.

--- example, entirely by the heat content of the hot, saturated process gas in the following manner:

First steam supply—from condensate boiler 41: 60,000 pounds per hour of 50 p.s.i.g. steam Second supply of steam—from solution reboiler 60: 94,800 pounds of steam per hour at 6 p.s.i.g.

Steam supplied by flashing: 48,300 pounds per hour of steam at 0 p.s.i.g. (compressed in steam ejector to a pressure of 6 p.s.i.g. after mixing with motive steam)

The following comparative runs A and B demonstrate the advantages of the invention over conventional systems. In runs A and B, the identical feed gas is used as in Example 1 and the identical system and equipment is used except as noted. In Run A, the system is identical except that boiler 41, flash tank 29 and steam ejector 30 are eliminated; and, instead, the hot gas mixture is fed directly to solution reboiler 60, entering at 172° C. and leaving at 123° C., thereby generating 154,800 pounds per hour of steam which is fed into the base of the regenerator as stripping steam. In order to provide the 48,300 pounds per hour of additional stripping steam requirements not provided by the solution reboiler, live steam from an outside source, at the rate of 48,300 pounds per hour, is fed into the base of the regenerator.

In Run B, the identical system is used except that boiler 41 is omitted and the hot feed gas is fed directly to solution reboiler 60, entering at 172° C. and leaving at 123° C., producing 154,800 pounds per hour of steam at 6 p.s.i.g., which is fed to the base of the regenerator as stripping steam. In order to provide the additional steam requirements of 48,300 pounds per hour not provided by the solution reboiler, a steam ejector and flash tank are employed as shown in FIG. 1, except that the steam ejector in Run B employs an outside source of steam at 50 p.s.i.g. (instead of steam generated by the process gas in boiler 41). With this arrangement, 22,400 pounds per hour of outside motive steam is required which in turn generates 25,900 pounds per hour of flash steam in flash tank 29 which is compressed and is fed, together with the motive steam, into the base of the regenerator as stripping steam.

The marked improvement in thermal efficiency in the use of heat contained in the hot feed gas through the use of the system of the invention is apparent by the following tabulated comparison of Example 1, and Runs A and B:

|  | Pounds per hour | |
|---|---|---|
|  | Total stripping steam requirements | Outside steam requirements |
| Example 1 | 203,100 | 0 |
| Run A | 203,100 | 48,300 |
| Run B | 203,100 | 22,400 |

As is apparent from the above table, in the system of the invention all stripping steam required is provided by the hot feed gas. In Run A, on the other hand, where a solution reboiler only is employed, outside steam requirements amount to 48,300 pounds per hour in addition to the heat recoverable from the process gas, equivalent to an increase in the heat requirements of 23.8%. In Run B, using a solution reboiler and with the steam ejector operated by steam generated outside the system, the process gas is also incapable of providing all stripping steam requirements, an additional 11.0% being required.

In the operation of the system of the invention, the first supply of steam, which is generated by passing the hot feed gas in indirect heat exchange with water, should be produced at a superatmospheric pressure sufficient to operate the steam ejector to produce a reduced pressure in the flash tank and to compress the flash steam to an intermediate pressure slightly above that prevailing at the base of the regenerator. This will generally require that the first steam supply be generated at a pressure of from 35 to 60 p.s.i.g. Generation of steam at such pressures will require hot feed gas temperatures generally above 165° C., and preferably above about 170° C.

It is highly advantageous to supply the feed water required for the generation of the first steam supply from aqueous condensate produced by the condensation of water vapor evolved from the scrubbing solution. An ample supply of such aqueous condensate will generally be available from the overhead condenser which is employed to condense steam from the steam-acid gas mixture leaving the top of the regenerator. Condensation of a portion of the water vapor content of this mixture and return thereof to the system generally is required to maintain a proper water balance in the system, and a portion of the aqueous condensate thus produced will generally be ample to supply the feed water requirements for the generation of the first source of superatmospheric-pressure steam for the operation of the steam ejector. It is understood, of course, that other sources of aqueous condensate produced by condensation of water vapor evolved from the scrubbing solution (such, for example, as condensate from overhead condenser 17 in FIG. 1), may be employed.

Two important advantages result from the use of aqueous condensate produced in the system to supply feed water for the generation of the first supply of steam. First, this eliminates the necessity for providing an outside source of treated boiler feed water. Such outside feed water, after passing through the scrubbing system, would be recovered as overhead condensate contaminated with components of the scrubbing solution (such as potassium carbonate) and would have to be discarded or be reprocessed before becoming suitable for reuse in other systems. By using aqueous condensate generated in the scrubbing system, the scrubbing solution contaminants are kept entirely within the scrubbing system since, in effect, the aqueous condensate is continuously recycled around the system and can be continually reused without reprocessing. A second important advantage of employing internally generated aqueous condensate as feed water for the first supply of steam is that the feed water is thereby suplied in a preheated condition, it being generally available from the overhead condenser directly or from a preheater plate such as plate 49 in FIG. 1 at temperatures of from 50° C. to 100° C.

A further advantage of the system of the invention, involving the use, in series of a water boiler and a solution reboiler to recover heat from the hot feed gas, is that the solution reboiler will, in such a system, operate at a considerably lower temperature. Note, e.g., that in Example 1 the hot feed gas enters the solution reboiler at a temperature of 160° C. rather than at its initial temperature of 172° C. The operation of the solution reboiler at a low temperature has the considerable advantage of minimizing corrosion in this portion of the system since the boiling scrubbing solution is a considerably more corrosive medium than boiling water, and the lowering of the maximum temperature in the solution reboiler reduces considerably the tendency for corrosion to occur in this reboiler.

The second supply of steam generated in the scrubbing solution reboiler will generally be generated at a pressure slightly above that prevailing at the base of the regeneration column, and will generally be at a pressure substantially less than that of the first steam supply.

The amount of flash steam that may be economically recovered and then compressed in the steam ejector and reused as stripping steam will depend upon a number of factors. This will depend first on the amount of motive steam available for the operation of the steam ejector and this, in turn, of course, depends upon the amount of moderate-pressure steam that may be economically generated in the water boiler. The amount of flash steam that can be generated will depend secondly on the proportion of the scrubbing solution that is subjected to flashing. For a given supply of motive steam, the greater the proportion of solution subjected to the flashing operation, the greater the amount of flash steam that will be generated. This follows from the fact that, for a given amount of motive steam, greater amounts of flash steam are produced by subjecting a larger amount of scrubbing solution to a relatively smaller reduction of pressure than are produced by subjecting a smaller proportion of the scrubbing solution to a greater pressure reduction. For this reason, it is highly advantageous, in the system of the invention, to subject all, or substantially all, of the scrubbing solution to the flashing operation as in the system illustrated in FIG. 1. In this fashion, the limited supply of motive steam that may be generated with the use of the hot feed gas will generate the maximum amount of flash steam that can be compressed and usefully employed as stripping steam.

In carrying out the flashing operation, it will generally be found that optimum utilization of the motive steam is achieved by operating the steam ejector to produce an amount of flash steam which will correspond to a drop in the scrubbing solution temperature (as a result of the endothermic steam flashing) of from about 4° C. to 20° C., and preferably from 6° C. to 15° C.

The cooling of the solution which occurs during the endothermic flashing operation is advantageous in several respects. It provides, first of all, a moderately reduced temperature in the absorber which has the advantage of reducing the back pressure of acid gas over the solution and thus facilitating absorption to lower residual acid gas levels. Where a portion of the solution is further cooled, as in cooler 39 in the embodiment of FIG. 1, the size of the solution cooler and the cooling water or cooling air requirement is also correspondingly reduced.

The system of the invention is particularly advantageous when employed in connection with a regenerator operated at moderate superatmospheric pressures, namely at pressures ranging of the order of 5 to 35 p.s.i.g., and more generally in the range of from 10 to 30 p.s.i.g. The operation of the regenerator at such moderate superatmospheric pressures has the advantage of providing the acid gas under pressure which in turn reduces compression costs where the acid gas, such as $CO_2$, is to be employed in a pressurized system, such as for the manufacture of Dry Ice or for subsequent conversion to urea by reaction with ammonia. Another important advantage of the pressurized regenerator is the increased rate of desorption of acid gas that occurs because of the higher solution temperatures induced by the higher pressure. This in turn permits the use of a regenerator of a considerably reduced size.

When used in combination with a pressurized regenerator, the system of the invention produces particularly attractive results as illustrated by the following example.

EXAMPLE 2

A feed gas identical with that of Example 1 except that it is at a temperature of 173° C. is employed in the type of system shown in FIG. 1. The scrubbing solution employed, the gas flows and the solution flows are the same as those in Example 1. The hot feed gas is first fed through boiler 41, entering at 173° C. and leaving at 160° C. thereby raising 65,000 pounds per hour of steam at 50 p.s.i.g. which is used for the operation of the steam ejector 30. The hot gas is then fed through the solution reboiler 60, entering at a temperature of 160° C. and leaving at 135° C., thereby raising 73,300 pounds per hour of steam at a pressure of 16 p.s.i.g. which is introduced into the base of the regenerator as stripping steam.

The regenerator is operated at an elevated pressure of 12 p.s.i.g. at the top of the tower, the pressure being 15 p.s.i.g. at the bottom due to the pressure drop through the packing. As a result of the higher regenerator pressure, the solution collecting in sump 25 at the bottom of the regenerator is at a higher temperature, viz. 125° C. The hot solution at the base of the regenerator, at a temperature of 125° C., is fed to flashing tank 29 maintained at a pressure of 7.8 p.s.i.g. by means of steam ejector 30. As a result of the pressure reduction in flash tank 29, flash steam is evolved at the rate of 49,100 pounds per hour. This is combined with the motive steam entering steam ejector 30 at the rate of 65,000 pounds per hour and the mixture of flash steam and motive steam, amounting to 114,100 pounds per hour at an intermediate pressure of 16 p.s.i.g., enters the base of the regenerator as stripping steam. As a result of the flashing in tank 29, the solution cools to a temperature of 116° C., and is then fed to the absorber by line 34, recycle pump 35, and line 36 to flow control valve 37 where it is divided into two streams, one flowing by line 12 at a temperature of 116° C. to the absorber over section A and the other flowing to solution cooler 39 where it is cooled to 70° C. and flows into the top of the absorber.

The hot feed gas from solution reboiler 60, now cooled to a temperature of 135° C., is passed through a broiler feed water heater where 11.1 million BTU's per hour of heat is recovered and then, at a temperature of 129° C., it is introduced into the base of the absorber.

In Example 2 as in Example 1, all the steam required for steam-stripping the solution (total of 187,400 pounds per hour) is supplied by the feed gas in the following manner:

First steam supply (water
    boiler 41) _____ 65,000 pounds per hour of
                              steam at 50 p.s.i.g.
Second steam supply
    (solution reboiler) _____ 73,300 pounds per hour of
                              steam at 16 p.s.i.g.
Flash steam generated
    in flash tank 29 _____ 49,100 pounds per hour of
                              steam at 7.8 p.s.i.g. (compressed to an intermediate pressure of 16 p.s.i.g. in steam ejector 30).

The advantages of the system of the invention as applied to a pressurized regeneration system may be appreciated by comparison of the results of Example 2 with those obtained in conventional systems (Runs C and D). In Run C, the identical feed gas and identical system was employed except that the feed gas is fed directly to a solution reboiler at an initial temperature of 173° C., leaving at a temperature of 135° C., and resulting in the generation of 138,300 pounds per hour of steam. The hot feed gas is then passed through a boiler feed water heater as in Example 2 and is introduced into the absorber at 129° C. To make up the additional stripping steam requirements not supplied by the solution reboiler, outside steam at the rate of 49,100 pounds per hour is introduced into the base of the regenerator.

In Run D, the identical feed gas and identical system was used as in Example 2 except that the feed gas goes directly to the solution reboiler 60, entering at 173° C. and leaving at 135° C., and thence to a boiler feed water heater after which it is introduced into the absorber at a temperature of 129° C. A flash tank and steam ejector is employed, except, that the steam ejector is operated with the use of outside steam supplied at a pressure of 50 p.s.i.g. In Run D, 24,700 pounds per hour of outside steam is required for the operation of the steam ejector.

The markedly higher heat efficiencies obtained through the use of the system of the invention are illustrated in the following summary table:

|  | Pounds per hour | |
|---|---|---|
|  | Total stripping steam requirements | Outside steam requirements |
| Example 2 | 187,400 | 0 |
| Run C | 187,400 | 49,100 |
| Run D | 187,400 | 24,700 |

The embodiment of FIG. 1 is a particularly preferred form of the invention, characterized not only by high thermal efficiency, but also by simplicity of design. It requires only one solution circulation pump (viz. pump 35) and only one stage of regeneration (i.e. all of the scrubbing solution is regenerated to the same degree in one stripping zone) while at the same time it is capable of reducing the acid gas content of the purified gas to a low residual level. It is understood, however, that the invention is also applicable to other systems such as the system of FIG. 3 which also represents a preferred embodiment.

Figure 3:
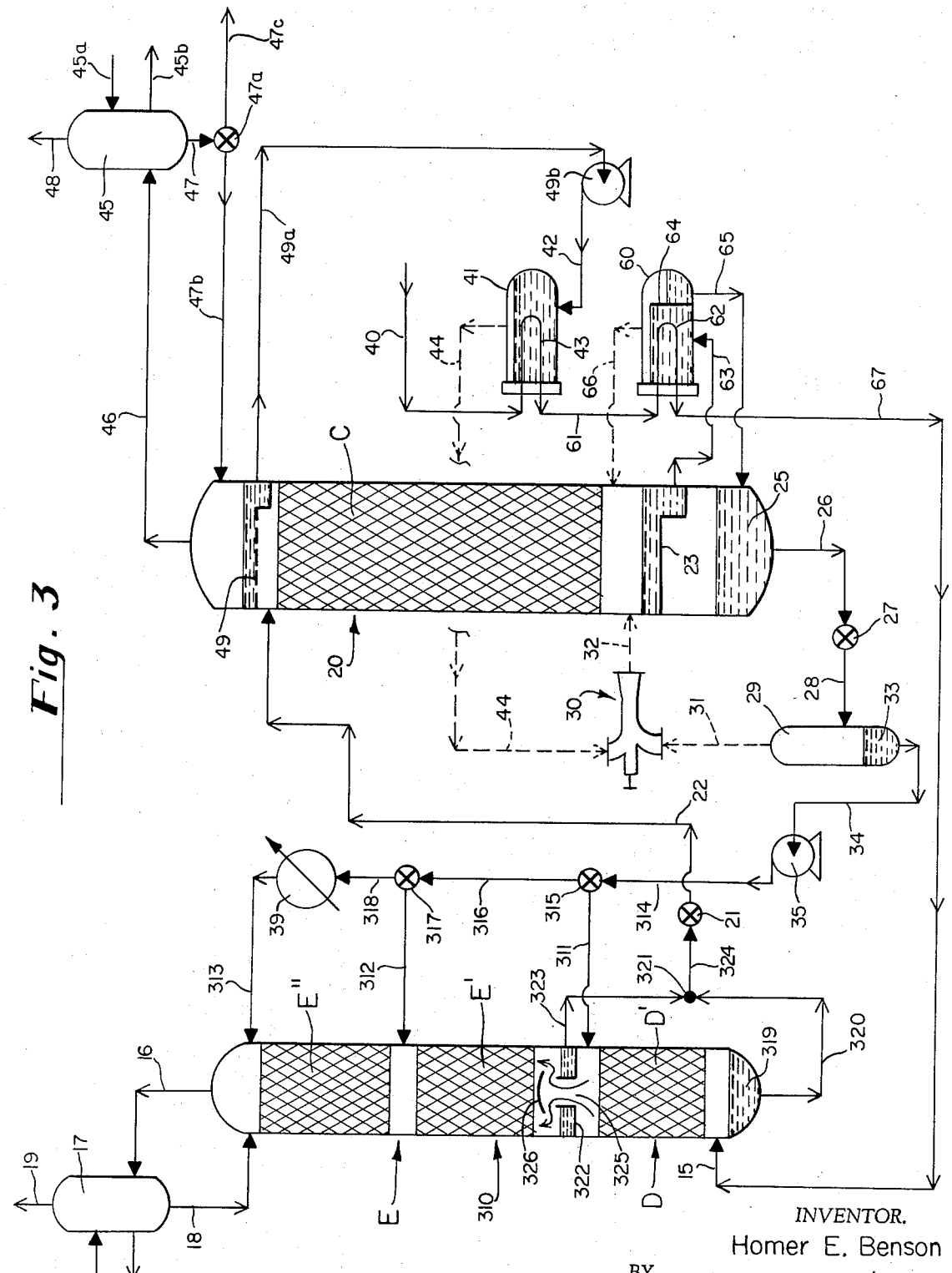
FIG. 3 is a diagrammatic flow sheet illustrating another embodiment of the invention.

Referring now to FIG. 3, it will be necessary only to refer specifically to the portions of the system that differ from those of FIG. 1. For brevity, the same reference numerals have been applied in FIG. 3 to elements which are the same as those in FIG. 1. It will be noted that the heat recovery system, viz. boiler 41, reboiler 60, and the system comprising ejector 30 and flash tank 29, as well as regenerator 20, are the same as the system of FIG. 1. The system of FIG. 3 differs from that of FIG. 1 in the use of an absorber tower divided into two separate zones permitting the substantial reduction in the average diameter of the tower.

In FIG. 3, the absorber tower, which is generally designated by the reference numeral 310, contains two separate zones, namely a lower zone designated generally by the reference letter D which is provided with a cross-hatched section D' consisting of suitable packing or plates for insuring intimate gas-liquid contact, and an upper zone, designated by the reference letter E, containing two sections E' and E'' similarly provided with packing or other such means for insuring intimate gas-liquid contact.

The lower zone D is separately supplied with regenerated scrubbing solution by line 311. The upper zone E is separately supplied with two streams of scrubbing solution by lines 312 and 313, respectively. Scrubbing solution for both zones of the absorber is supplied by recycle pump 35 and line 314. The solution is first split into two portions by flow control valve 315, one portion flowing to the top of zone D by line 311 and the other flowing by line 316 to a second flow control valve 317 where it is again split into two portions, one flowing by line 312 to zone E above section E' and the other flowing by line 318, cooler 39 and line 313 to the top of the absorber tower above section E''. Typically, the solution flow in lines 311 and 316 will be roughly equal, while the solution flows in lines 312 and 313 will also be roughly the same.

Scrubbing solution supplied to separate absorption zone D by line 311 flows downwardly over packing or similar means D' and collects in sump 319 at the bottom of the absorber. The solution from zone D is then removed from the bottom of the absorber by line 320 and flows to junction 321 where it mixes with solution from separate absorption zone E as will now be described.

Cooled solution fed into the top of zone E of the absorber by line 313 flows downwardly over packing or other means E' and then mixes with solution introduced into zone E by line 312. The mixed solution then flows downwardly over packing or other means E' and is collected on collecting tray 322 at the bottom of zone E. Solution on collecting tray 322 is drawn off from zone E by line 323 and is conducted to junction 321 where it mixes with solution separately flowing from zone D. The mixed, spent solutions then flow by line 324, pressure letdown valve 21 and line 22 to the top of the regeneration tower 20 where regeneration occurs as previously described in connection with FIG. 1.

It will be apparent from the above description that each separate zone D and E of the absorber is provided with a separate supply of scrubbing solution which is separately withdrawn from each zone. Thus, regenerated scrubbing solution enters zone D by line 311 and leaves separately by line 320, while scrubbing solution enters zone E by lines 313 and 312, and is separately withdrawn by line 323.

The gas flows through the absorber, on the other hand, in series through zones D and E. Gas entering by line 15 flows upwardly through zone D countercurrently to scrubbing solution introduced through line 311, and then flows through chimney 325 provided in collecting plate 322 as shown by the arrows indicating gas flow. A deflector 326 is provided above chimney 325 to prevent scrubbing solution from flowing downwardly through the chimney while permitting the gas to flow upwardly. After passing through chimney 325, the gas then passes countercurrently to scrubbing solution introduced into zone E through lines 313 and 312, and then passes out of the top of the absorber in a purified condition by line 16.

The operation of the system of FIG. 3 will now be illustrated by the following example.

EXAMPLE 3

A hot, saturated feed gas, having the same composition and at the same pressure, temperature and flow rate as that of Example 2, is introduced into the system of FIG. 3 through line 40, entering boiler 41 at a temperature of 173° C. and leaving by line 61 at a temperature of 160° C. In boiler 41, fed with aqueous condensate by line 42, there is generated 65,000 pounds per hour of steam at 50 p.s.i.g. which is fed by line 44 to steam ejector 30. The partially cooled feed gas, at a temperature of 160° C., then passes into solution reboiler 60 through coil 62 and produces steam by boiling of scrubbing solution fed to the reboiler having the same composition as that in Example 1, thereby raising 85,500 pounds of steam at 11 p.s.i.g. The gas mixture leaves reboiler 60 at a temperature of 129° C. and is introduced at this temperature into the bottom of absorber 310 operating at a pressure of 375 p.s.i.g. Regenerator 20 is operated at a pressure (at the top of the tower) of 7 p.s.i.g. with a pressure of 10 p.s.i.g. at the bottom of the tower due to pressure drop through the packing C. Scrubbing solution collects in sump 25 at a temperature of 119° C. and a potassium bicarbonate fraction of 30%. The regenerated scrubbing solution is withdrawn by line 26 and, after passing through pressure letdown valve 27, enters flashing chamber 29 maintained at a pressure of 3 p.s.i.g. by steam ejector 30. This results in the evolution of 48,700 pounds per hour of flash steam at a pressure of 3 p.s.i.g. which mixes with motive steam from line 44, producing a combined stream at an intermediate pressure of 11 p.s.i.g. which is fed into the base of the regenerator by line 32 as stripping steam.

The scrubbing solution collects in sump 33 at the botsom of flash tank 29 at a temperature of 110° C. and is then conducted by line 34, recycle pump 35 and line 314 to flow control valve 315 where it is divided into two streams, one flowing by line 311 at a flow rate of 166,700 gallons per hour into the top of zone D of the absorber, and the other flowing by line 316 at the rate of 192,000 gallons per hour to flow control valve 317 where the stream is divided into two equal portions, one flowing at the rate of 96,000 gallons per hour at a temperature of 110° C. into zone E by line 312. The second portion, at the rate of 96,000 gallons per hour, flows by line 318 through cooler 39 where the solution is cooled to 70° C. and then into the top of zone E by line 313.

Scrubbing solution collects at the bottom of zone D in sump 319 at a temperature of 131° C. with a potassium bicarbonate fraction of 82% and then flows at the rate of 1,915,000 pounds per hour by line 320 to junction 321. Spent scrubbing solution collects at the bottom of zone E on collecting plate 322 at a temperature of 108° C. and at a potassium bicarbonate fraction of 74%, and is withdrawn at the rae of 2,175,000 pounds per hour by line 323 and conducted to junction 321 where it mixes with solution from zone D. The combined solutions, now at a temperature of 119.5° C. and an average potassium bicarbonate fraction of 78%, flow at the rate of 4,090,000 pounds per hour by line 22 to the top of the regenerator.

In this example, the savings in stripping steam are similar to those obtained in FIG. 1, and in addition, the average cross-sectional area of the absorber tower is reduced by 40%.

It will be recognized that the illustrative flow diagrams do not include all the necessary auxiliaries or instrumentation required for the practical operation of a commercial plant. Thus, for example, it will, of course, be necessary to provide separator, or knock-out, drums downstream from boiler 41 and reboiler 60 in FIG. 1 and FIG. 3 in order to separate the condensed water vapor that will accumulate in these lines as the saturated feed gas, entering by line 40, is cooled in its passage through these heat recovery systems. It is intended, of course, that such auxiliaries required by sound engineering practice, but not specifically shown, will be employed in the practical operation of the systems illustrated.

I claim:

1. In a cyclic process for removing acid gases selected from the group consisting of $CO_2$ and $H_2S$ from a hot steam containing feed gas by use of an aqueous alkaline scrubbing solution which is circulated between an absorption stage maintained at superatmospheric pressure and at least in part at temperatures in the vicinity of the atmospheric boiling temperature of such scrubbing solution, and a regeneration stage wherein such solution is steam-stripped at substantially reduced pressure to desorb said acid gas, and wherein the hot regenerated solution from the regeneration stage is subjected to flashing in a reduced pressure flashing zone by means of a steam ejector having its suction side connected to said flashing zone, and wherein at least the major portion of such stripping steam is supplied from heat contained in said hot steam containing feed gas, an improved method for recovering heat from said hot steam containing feed gas which comprises the steps of:
    (a) operating said regeneration stage at superatmospheric pressure in the range of from 5 to 35 pounds per square inch gauge whereby said solution leaves the regeneration stage at a temperature above the atmospheric boiling temperature of the solution;
    (b) passing said hot feed gas through a first heat exchanger and therein transferring a portion of the heat in said gas to water thereby generating a first supply of steam under superatmospheric pressure and partially cooling said feed gas;
    (c) feeding substantially all of the hot regenerated scrubbing solution from the regeneration zone at a temperature above the atmospheric boiling temperature of the solution to said flashing zone;
    (d) feeding said first supply of superatmospheric pressure steam to said steam ejector as motive steam to reduce the pressure in said flashing zone and to compress the flashed steam evolved therein and injecting said mixture of motive steam and flashed steam directly into said regeneration zone as live stripping steam;
    (e) passing said partially cooled feed gas through a second heat exchanger and therein transferring another portion of heat in said gas to such scrubbing solution thereby boiling said scrubbing solution and generating a second supply of steam at a lower level of pressure than said first supply and employing said second supply of lower pressure steam in said regeneration stage as additional stripping steam.

2. A method in accordance with claim 1 wherein the water for the generation of said first steam supply is provided by aqueous condensate produced by the condensation of water vapor evolved from said scrubbing solution.

3. A method in accordance with claim 1 in which the acid gas from said gas mixture is at least predominantly $CO_2$.

4. A method in accordance with claim 1 in which said scrubbing solution comprises an aqueous solution of potassium carbonate.

5. A method in accordance with claim 1 in which said scrubbing solution is an aqueous solution of potassium carbonate containing an additive of the group consisting of alkanolamines, alkalimetal borates, $As_2O_3$, and amino acids.

6. In a cyclic process for removing acid gases selected from the group consisting of $CO_2$ and $H_2S$ from a hot steam containing feed gas by use of an aqueous alkaline scrubbing solution which is circulated between an absorption stage maintained at superatmospheric pressure and at least in part at temperatures in the vicinity of the atmospheric boiling temperature of such scrubbing solution, and a regeneration stage wherein such solution is steam-stripped at substantially reduced pressure to desorb said acid gas, and wherein the hot regenerated solution from the regeneration stage is subjected to flashing in a reduced pressure flashing zone by means of a steam ejector having its suction side connected to said flashing zone, and wherein at least the major portion of such stripping steam is supplied from heat contained in said hot steam containing feed gas, and wherein aqueous condensate is produced by the condensation of water vapor evolved from such scrubbing solution, an improved method for recovering heat from said hot steam containing feed gas which comprises the steps of:

(a) operating said regeneration stage at superatmospheric pressure in the range of from 5 to 35 pounds per square inch gauge whereby said solution leaves the regeneration stage at a temperature above the atmospheric boiling temperature of the solution;

(b) collecting aqueous condensate evolved from such scrubbing solution and feeding such aqueous condensate to a first heat exchanger;

(c) passing said hot feed gas through said first heat exchanger and therein transferring a portion of the heat in said gas to said aqueous condensate thereby boiling said aqueous condensate and generating a first supply of steam under superatmospheric pressure and partially cooling said feed gas;

(d) feeding substantially all of the hot regenerated scrubbing solution from the regeneration zone at a temperature above the atmospheric boiling temperature of the solution to said flashing zone;

(e) feeding said first supply of superatmospheric pressure steam to said steam ejector as motive steam to reduce the pressure in said flashing zone and to compress the flashed steam evolved therein and injecting said mixture of motive steam and flashed steam directly into said regeneration zone as live stripping steam;

(f) passing said partially cooled feed gas through a second heat exchanger and therein transferring another portion of heat in said gas to such scrubbing solution thereby boiling said scrubbing solution and generating a second supply of steam at a lower level of pressure than said first supply and employing said second supply of lower pressure in said regeneration stage as additional stripping steam.

7. A method in accordance with claim 6 in which the acid gas in said gas mixture is at least predominantly $CO_2$.

8. A method in accordance with claim 6 in which said scrubbing solution comprises an aqueous solution of potassium carbonate.

9. A method in accordance with claim 6 in which said scrubbing solution is an aqueous solution of potassium carbonate containing an additive of the group consisting of alkanolamines, alkali metal borates, $As_2O_3$, and amino acids.

References Cited

UNITED STATES PATENTS

| | | | |
|---|---|---|---|
| 2,886,405 | 5/1959 | Benson et al. | 423—232 |
| 3,101,996 | 8/1963 | Bresler et al. | 423—229 |
| 3,144,301 | 8/1964 | Mayland | 423—229 |

EARL C. THOMAS, Primary Examiner

423—228, 232

U.S. Cl. X.R.